| United States Patent [19] | [11] 4,080,311 |
| --- | --- |
| Kehl | [45] Mar. 21, 1978 |

[54] THERMALLY STABLE PHOSPHATE CONTAINING ALUMINA PRECIPITATES AND THEIR METHOD OF PREPARATION

[75] Inventor: William L. Kehl, Indiana Township, Pa.

[73] Assignee: Gulf Research & Development Company, Pittsburgh, Pa.

[21] Appl. No.: 719,168

[22] Filed: Aug. 31, 1976

[51] Int. Cl.$^2$ ............................................. B01J 27/14
[52] U.S. Cl. ..................................... 252/437; 526/226
[58] Field of Search ......................................... 252/437

[56] References Cited

U.S. PATENT DOCUMENTS

| | | | |
| --- | --- | --- | --- |
| 2,301,913 | 11/1942 | Ueltman | 252/437 X |
| 2,349,827 | 5/1944 | Mattox | 252/437 X |
| 2,365,623 | 12/1944 | Bremner et al. | 252/437 X |
| 3,271,299 | 9/1966 | Kearby | 252/437 X |
| 3,320,331 | 5/1967 | Gaspar | 252/437 X |
| 3,342,750 | 9/1967 | Kearby | 252/437 |
| 3,904,550 | 9/1975 | Pine | 252/437 |
| 3,969,273 | 7/1976 | Brown et al. | 252/437 X |

*Primary Examiner*—Patrick P. Garvin
*Assistant Examiner*—William G. Wright

[57] ABSTRACT

Thermally stable composite precipitates containing aluminum phosphate and alumina and having a surface area of from about 100 to about 200 m$^2$/g together with an average pore radius of from 75 to 150 A are defined. These materials are prepared by neutralizing an aqueous solution of aluminum cations and PO$_4$ anions at a controlled pH of between 7 and 10.0, and wherein the neutralizing medium is either ammonia or certain defined amine based materials such as ammonium hydroxide, ammonium carbonate or urea. There is a stoichiometric excess of aluminum to phosphorus over that required to form AlPO$_4$. Due to their thermal stability these alumina-aluminum phosphates are particularly useful as catalyst supports for various reactions, including polymerization of ethylene.

13 Claims, 10 Drawing Figures

Figure 1:
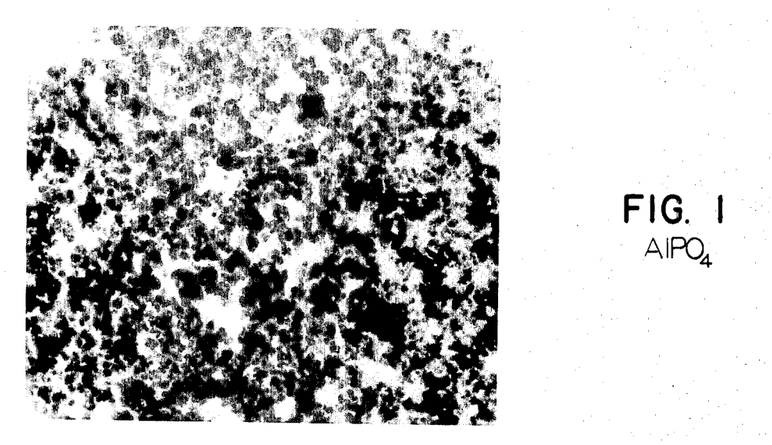

FIG. 1
AlPO₄

Figure 2:
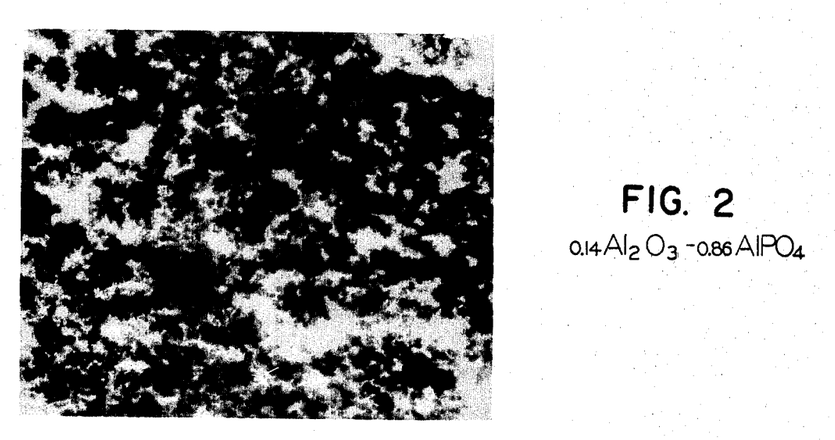

FIG. 2
0.14 Al₂O₃ - 0.86 AlPO₄

Figure 3:
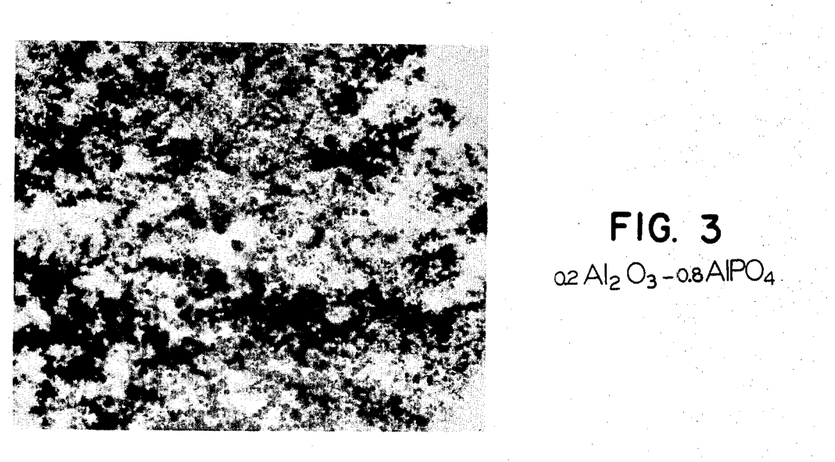
Figure 4:
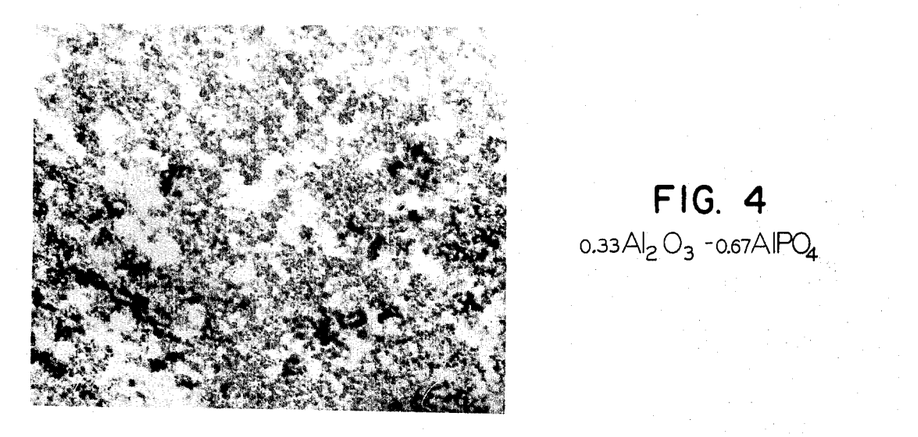
Figure 5:
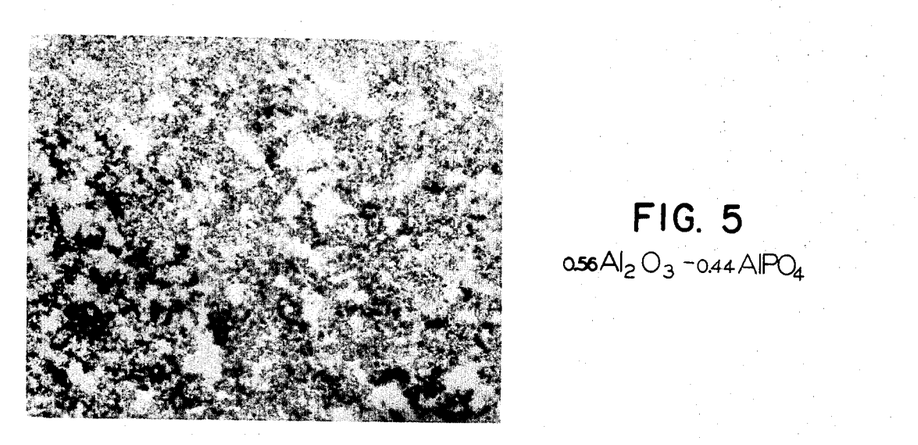
Figure 6:
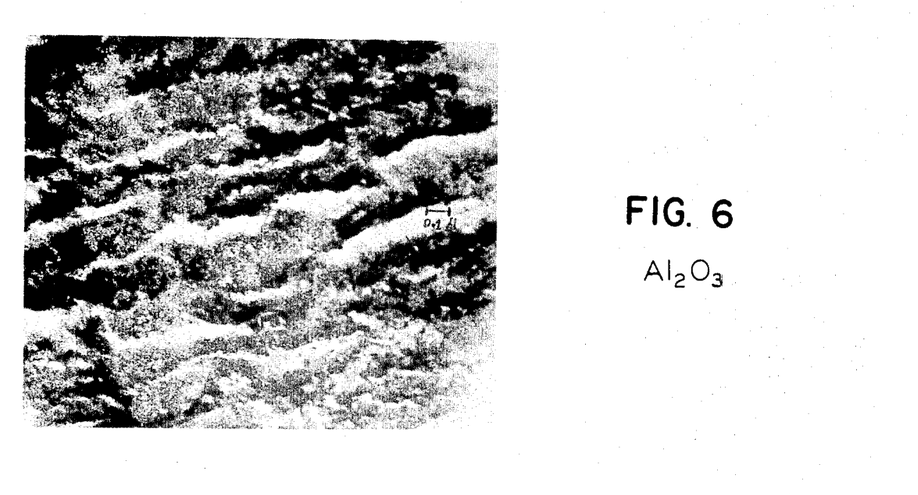

FIG. 3
0.2 Al₂O₃ - 0.8 AlPO₄

FIG. 4

$0.33Al_2O_3 - 0.67AlPO_4$

FIG. 5

$0.56Al_2O_3 - 0.44AlPO_4$

FIG. 6

$Al_2O_3$

Figure 7:
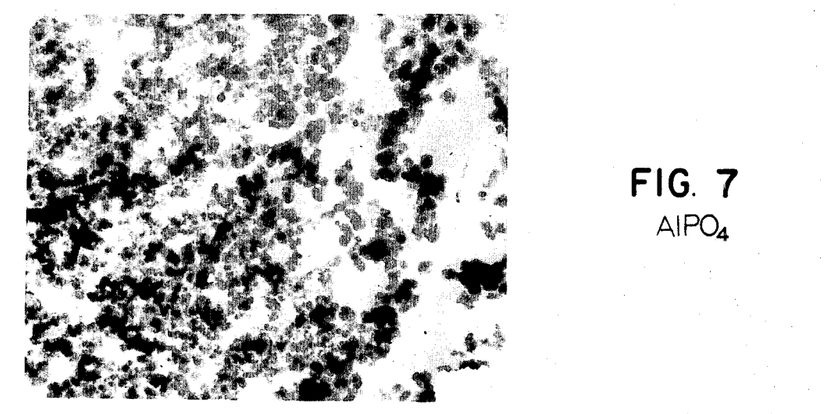

FIG. 7
AlPO$_4$

Figure 8:
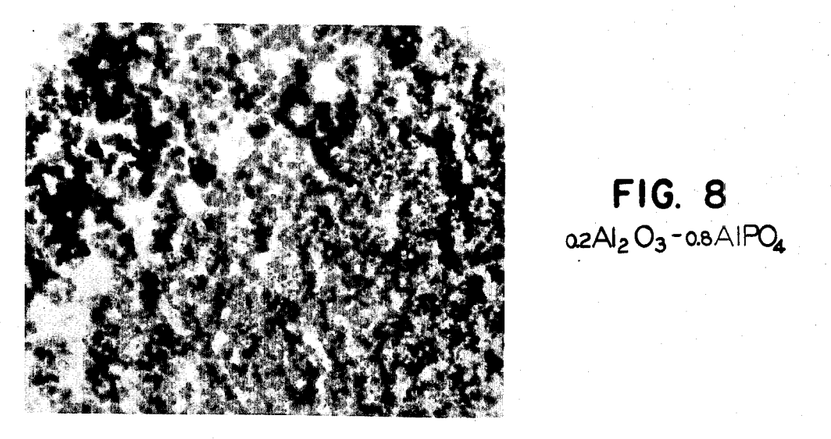

FIG. 8
0.2Al$_2$O$_3$ - 0.8AlPO$_4$

Figure 9:
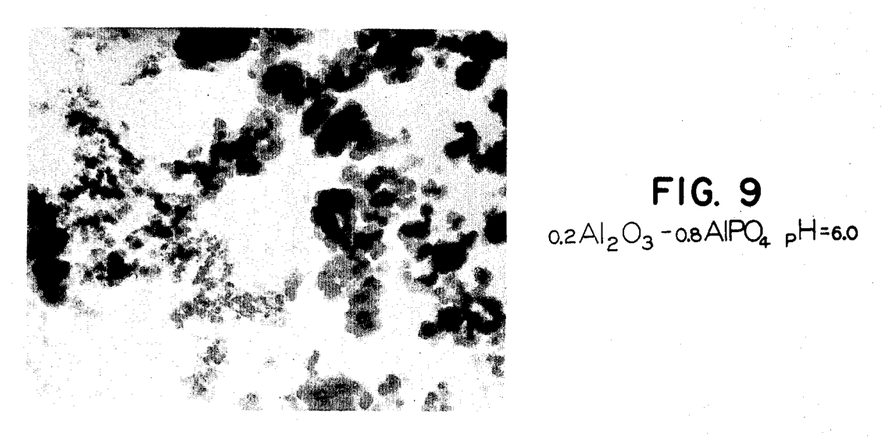

FIG. 9
0.2Al$_2$O$_3$ - 0.8AlPO$_4$  pH=6.0

Fig. 10

THERMALLY STABLE PHOSPHATE CONTAINING ALUMINA PRECIPITATES AND THEIR METHOD OF PREPARATION

This invention relates to new, thermally stable composite precipitates comprising alumina and aluminum phosphate and their method of preparation involving controlling the pH of the precipitating medium.

BACKGROUND OF THE INVENTION

Aluminum phosphate gels and precipitates are old in the art. U.S. Pat. No. 3,342,750 to K. K. Kearby indicates that aluminum phosphate is described in the prior art for use as a catalyst, and Kearby's contribution is the discovery of what he describes as a true hydrogel of aluminum phosphate which has a high surface area and which is thermally stable. Kearby teaches in Column 1, lines 62–66, that the prior art aluminum phosphate compounds were precipitates rather than hydrogels and that they have relatively low surface areas and poor heat stability. In Example 2 in Column 3 of Kearby, he teaches that the conventional method of making aluminum phosphate involves neutralizing an aqueous solution of aluminum chloride and phosphoric acid by slowly raising the pH of the acidified aluminum cation containing solution by the addition of base until a pH of about 7 is achieved. A more recent U.S. Pat. No. 3,904,550 to Lloyd A. Pine, entitled "Hydrocarbon Conversion Catalyst Comprising Alumina and Aluminum Phosphate", discusses Kearby's hydrogels and indicates the Kearby's precipitates are sensitive to water and difficult to form into a catalyst shape since they lose a substantial part of their surface area during the forming process (Col. 1, lines 26 et seq.). Both the Kearby and Pine references are assigned to the same assignee. Pine indicates that he has overcome the difficulties of the Kearby aluminum phosphate materials by preparing his aluminum phosphates as precipitates from an aluminum alkoxide. Such aluminum alkoxides are pyrophoric in nature and are thereby much more difficult to handle and are considerably more expensive than the more common aluminum inorganic salts such as aluminum chloride and aluminum nitrate.

The procedure of Kearby for producing a true aluminum phosphate hydrogel and the procedure of Pine to produce an alumina-aluminum phosphate precipitate which does not have the water sensitivity of the Kearby hydrogels are both quite complicated and thus expensive from a commercial standpoint. There is thus a need for a simplified method of preparing an alumina-aluminum phosphate composite precipitate by a simple technique whereby the precipitates are usable in catalytic applications by possessing sufficient thermal stability. In addition it is desirable from a catalytic application standpoint that such alumina-aluminum phosphate composition precipitates have as large an average pore radius as possible to admit the larger size molecules to the internal portions of the support where reaction can occur and subsequently to allow the molecules which are formed an easy access out of the catalyst support material.

A new class of thermally stable composite precipitates containing from 10 to 60 mole percent alumina and from 40 to 90 mole percent aluminum phosphate have now been discovered which have surface areas after calcining of from about 100 to about 200 $m^2/g$ and which have an average pore radius of from 75 to 150 A. Calcining occurs at temperatures from 300° to 500° C. for times up to 16 hours. That such materials are thermally stable is evidenced by the fact that these materials after additional calcination at temperatures up to 900° C. and times of up to 16 hours lose no more than about 30% of the surface areas which is available at a calcination temperature of 500° C. for 16 hours. As will be shown below, the thermal stability of the materials of this invention is surprising in view of their high average pore radii.

The above new class of thermally stable alumina-aluminum phosphate composite precipitates are prepared by:

forming a first aqueous solution of aluminum cations and $PO_4^{---}$ anions wherein the molar ratio of the $PO_4^{---}$ anions to the aluminum cations is 0.82:1 to 0.25:1;

neutralizing said first aqueous solution with ammonia gas or a second aqueous solution of an ammonia based material selected from the group consisting of ammonium hydroxide, ammonium carbonate, ammonium bicarbonate or urea in such a manner that the pH of the combined first aqueous solution and the neutralizing medium is controlled in the range of 7 to 10;

recovering said precipitate;

drying said precipitate; and calcining said precipitate at a temperature from 300° to 500° C. for a time up to 16 hours to form an alumina-aluminum phosphate composite material having a surface area from about 100 to about 200 $m^2/g$, an average pore radius from 75 to 150 A, and wherein no more than a 30% decrease in surface area is obtained if said composite precipitate is calcined at 500° C. for 16 hours and is further calcined at a temperature up to about 900° C. for up to 16 hours.

DETAILED DESCRIPTION OF INVENTION

Aluminum phosphate precipitates and hydrogels alone or composited with alumina are known in the art. Chemically pure aluminum phosphate hydrogels and precipitates are very closely related, having the empirical formula $AlPO_4$. $AlPO_4$ may be either amorphous or crystalline depending on its method of preparation, but in either case the $AlPO_4$ will crystallize by heating to temperatures on the order of 1100° C. with a consequent great loss in surface area. It is also known that physical properties such as surface area and pore size can differ significantly not only between aluminum phosphate hydrogels and precipitates but even between various types of precipitates. Kearby in U.S. Pat. No. 3,342,750, referred to above, was concerned with the preparation of "true hydrogels of aluminum phosphate" (Col. 1, lines 17–18) in order to obtain catalyst supports having heat stability. Heat stability is, of course, an essential property for a catalyst support, especially if regeneration of the catalyst is required. Kearby in Column 1, lines 62 et seq., teaches that prior art aluminum phosphates were precipitates as contrasted with Kearby's hydrogels and possessed relatively low surface areas, poor heat stability and were only moderately active as catalysts.

As noted above, hydrogels and precipitates of aluminum phosphate are substantially equivalent chemically. Actually the formation of a hydrogel is a special phenomenon which occurs during precipitation if the environment or conditions during precipitation are carefully controlled. Kearby discovered one particular method to prepare true hydrogels of aluminum phosphate and describes and claims his method in the U.S. Pat. No.

3,342,750 reference. In his Example 2 in Column 3, Kearby describes the preparation of an aluminum phosphate precipitate "by a conventional procedure". In essence, Kearby describes the "conventional procedure" as the addition of ammonium hydroxide to a phosphoric acid acidified aqueous solution of aluminum chloride to slowly raise the pH from a low initial value to a pH of 7.0. Calcining of this material at 1400° F. (760° C.) reduced the surface area over 50% (from 215 m$^2$/g to 102 m$^2$/g). Under similar conditions Kearby's hydrogel lost only 18.5% in surface area. Kearby concludes that aluminum phosphate precipitates do not possess thermal stability.

Certain alumina-aluminum phosphate composite precipitates have now been discovered which have excellent thermal stability together with relatively high average pore radii so that these materials are particularly suited for use as catalyst support materials, especially for use in reactions involving relatively large molecules in order to allow the molecules easy ingress and egress.

The alumina-aluminum phosphate composite precipitates, i.e. coprecipitates of alumina and aluminum phosphate, in certain proportions are, in accordance with the invention, new compositions of matter. These new compositions are characterized by containing from a stoichiometric viewpoint from 10 to 60 mole percent alumina and from 40 to 90 mole percent aluminum phosphate.

Further, after drying and calcining at a temperature of 500° C. for 16 hours, the new alumina-aluminum phosphate coprecipitates of this invention (i) are amorphous, (ii) have a surface area of from about 100 to about 200 m$^2$/g, and (iii) have an average pore radius of from 75 A to about 150 A.

In addition, the new alumina-aluminum phosphate coprecipitates of this invention possess thermal stability in the sense that the surface area decrease upon further calcination (initial calcination is at a temperature of 500° C. for a time of 16 hours at a temperature from above 500° C. to 900° C. for a time of up to 16 hours is less than 30%.

The term "alumina-aluminum phosphate" is used as a matter of convenience and is not meant to imply a physical admixture of alumina and aluminum phosphate. Quite to the contrary, the term "composite" is used to denote the new compositions are not physical admixtures.

In support of this, reference is made to the attached FIGS. 1 through 9, which are typical photomicrographs of various alumina-aluminum phosphate preparations made by the method of this invention. Referring to FIGS. 1 through 5, the salient features of these Figures show that the aluminum phosphate and the alumina-aluminum phosphate coprecipitates are generally similar in appearance, but the particle size decreases as the alumina content increases. Pure alumina (FIG. 6) has a markedly different appearance, and the particles are much smaller than in the alumina-aluminum phosphate composites. The overall appearance of the particles in the alumina-aluminum phosphate composites suggests some kind of interaction between the AlPO$_4$ and the Al$_2$O$_3$ components. The nature of this interaction cannot be determined from the micrographs.

FIGS. 7 and 8 represent photomicrographs of the material shown in FIGS. 1 and 3, respectively, which has been further calcined at 900° C. for 16 hours. Comparing FIGS. 7 and 8 with FIGS. 1 and 3 shows such additional calcination at 900° C. has little apparent effect on the morphology. This is consistent with the surface area and pore data to be presented later and is further evidence of the unusual high temperature stability of the materials of this invention.

FIG. 9 illustrates the same chemical product as in FIG. 3 except precipitation occurred at a constant pH of 6, which is outside the invention as will be discussed below. The particles are larger and less densely compacted when the pH during precipitation is 6. The pH during precipitation for the materials shown in FIGS. 1-5 was maintained at 8.

Further, the alumina-aluminum phosphate coprecipitates made in accordance with the invention can be either amorphous or crystalline after oven-drying but prior to calcination. X-ray diffraction analysis of the oven-dried alumina-aluminum phosphate coprecipitates of this invention indicates that neither the amorphous nor the crystalline product is simply a mixture of alumina hydrate and aluminum phosphate. The alumina hydrates precipitated separately under these conditions are always crystalline and are readily identified by X-ray diffraction. These also are readily distinguished from the crystalline aluminum phosphates. Since neither of these separate phases is observed in the coprecipitation product, either amorphous or crystalline, it must be concluded that the product is a reaction compound or complex. Calcination of these precipitates at 500° C. for 16 hours, both amorphous and crystalline, results in an amorphous product. This is further evidence of reaction or interaction between the alumina and aluminum phosphate, since if there were no interaction between the two, a gamma-alumina phase would form which would be detected by X-ray diffraction. Still further evidence that these materials are interaction or reaction products and not mixtures of separate alumina and aluminum phosphate phases is provided by the results of the high-temperature calcination study. At 900° C. any free alumina would appear as crystalline $\theta$-Al$_2$O$_3$ and would be detected by X-ray diffraction. The fact is that the alumina-aluminum phosphates were still amorphous after calcination at 900° C. This is also shown by a lack of change in appearance as noted above with respect to a comparison of FIGS. 7 and 8 with FIGS. 1 and 3.

As noted above, this invention relates to new, amorphous coprecipitates containing aluminum and phosphorus moieties. The aluminum to phosphorus moieties are present in an atomic ratio in the range of about 1.2:1 to 4.0:1, and preferably in the range of about 1.67:1 to 3.0:1, and most preferably about 2.0:1. By maintaining the Al:P moieties within these ranges, the amount of alumina in the coprecipitates will be from 10 to 60 mole percent, preferably from 25 to 50 mole percent, and most preferably about 33 mole percent. Similarly the aluminum phosphate content will be from 40 to 90 mole percent, preferably from 50 to 75 mole percent, and most preferably about 67 mole percent.

The surface area of the coprecipitates of this invention measured by the BET method after calcination at 500° C. for 16 hours is from about 100 to about 200 m$^2$/g. In addition, the average pore radius of the new compositions described herein is from 75 A to about 150 A after calcination at 500° C. for 16 hours, and more usually is from 90 A to 130 A, and most usually from 100 A to 130 A.

The average pore radius of the new composition of this invention is one-half of the average pore diameter, which is a calculated figure using the formula:

$$\text{Average Pore Diameter A} = \frac{4 \times 10^4 \text{ pore volume (cc/g)}}{\text{surface area (m}^2\text{/g)}}$$

where pore volume and surface area are both measured by the BET method. This method of determining average pore diameter is an accepted technique in the art and is described in Ciapetta, F. C. and Henderson, D. S., Oil & Gas Journal 65, 88 (1967).

It has also been found that the new compositions of this invention despite their high average pore radii possess unexpectedly superior thermal stability which allows the alumina-aluminum phosphate materials to be utilized as catalysts or catalyst supports. Thermal stability is normally measured by a decrease in the surface area under increasingly severe calcination conditions. Thermal stability is therefore only meaningful in conjunction with the temperature and time conditions of calcination. For purposes of this invention, "thermal stability" is defined as the percent decrease in surface area which occurs upon further calcination of the alumina-aluminum phosphate coprecipitates at a temperature of up to 900° C. for a time of up to 16 hours. Initial calcination was, as noted above, at 500° C. for 16 hours. It has been found that the alumina-aluminum phosphate materials of this invention will have a surface area decrease of less than about 30%, usually less than 20%, when further calcined at temperatures up to 900° C. for times as long as 16 hours.

METHOD OF PREPARATION

As noted above, Kearby teaches that the conventional method of making aluminum phosphate precipitates or coprecipitates is to neutralize an acidic medium containing aluminum cations and phosphate anions. When pH is increased to about 6 or higher, the aluminum and phosphorus moities precipitate from the aqueous medium. While this method of preparation is quite simple, the resulting precipitates are thermally unstable, according to Kearby, and unsuitable for use as catalysts or catalyst supports. In addition, the conventional method described by Kearby produces alumina-aluminum phosphate composites having relatively low average pore radii, rendering such materials of less value as catalyst supports.

One method has now been found to prepare the thermally stable alumina-aluminum phosphate composite precipitates of this invention. This technique is also quite simple and involves the simultaneous addition of a solution of aluminum cations and phosphate anions, ammonia, or an aqueous solution of an ammonia-based material selected from the group consisting of ammonium hydroxide, ammonium carbonate, ammonium bicarbonate, or urea, to a stirred aqueous medium in such a manner that the pH of the combined solutions is maintained at a constant value between about 7 to about 10.0, preferably from 8.0 to 10.0. Precipitation while maintaining the pH at 6 results in a poor product as shown in FIG. 9 and discussed below. The resultant precipitate is easily separated from the supernatant liquid by filtration, and the precipitate can then be dried and calcined by any conventional technique.

In preparing the new compositions of this invention, the first aqueous solution of aluminum cations is formed by dissolving any suitable inorganic aluminum salt in water. Suitable aluminum salts include: aluminum chloride, aluminum nitrate and aluminum sulfate. In essence, any aluminum salt which is soluble in water can be employed, and the particular type of aluminum salt is not critical. The concentration of the aluminum salt to employ is not critical and is really a function of the volume of solution that can be handled conveniently and the ease of controlling the pH during the precipitation step.

The aqueous solution of aluminum cations is acidified with phosphoric acid, which also provides the source of phosphate anions. Any concentration of phosphoric acid can be used, and the ratio of phosphorus to aluminum in the acidified solution is controlled to provide the aluminum to phosphorus molar ratio desired in the final product. The pH of the acidified solution containing the aluminum cations and phosphorus anions is usually about 1.0.

The first aqueous solution is neutralized either with ammonia gas or a second aqueous solution of an ammonia based material selected from the group consisting of ammonium hydroxide, ammonium carbonate, ammonium bicarbonate, or urea. The mannner of neutralization is controlled so that the pH of the combined first aqueous solution and the neutralizing medium is in the range of 7 to 10.0. This is normally done by adding controlled amounts of (i) an acidified aqueous solution of aluminum cations and phosphate anions and (ii) a neutralizing medium as described to a common vessel in such a manner that the pH of the combined aqueous solution and neutralizing medium is maintained in the desired range of 7 to 10.0, preferably 8.0 to 10.0. Vigorous stirring is, of course, essential so that isolated zones of material outside of the desired pH range are substantially nonexistent. The temperature at which the neutralization is effected is not critical, and atmospheric conditions are quite satisfactory. The technique of forming precipitates by controlled pH is not new per se, but the technique as applied to the preparation of alumina-aluminum phosphate coprecipitates does give rise to the formation of unexpectedly thermally stable precipitates as noted above having unusually high average pore radii and relatively low surface area.

After formation of the alumina-aluminum phosphate coprecipitates by the controlled pH technique, the coprecipitate is recovered by any conventional procedure such as filtration or centrifugation. The material is then washed to free the coprecipitate of occluded ions and then dried by any suitable technique such as the use of a drying oven or by spray-drying. The temperature of drying is usually from 100° to 130° C. for times varying from 6 to 30 hours. Spray-drying, of course, is very rapid and results in the formation of small-particle-size beads which are suitable for use in fluid-bed type operations.

After drying, the precipitates are activated by heating to an elevated temperature. Usually the heating is done in an atmosphere containing oxygen, e.g. air, at a temperature from about 300° to 500° C. for a time of up to 16 hours, usually a time of from 2 to 16 hours. After drying and calcining at 500° C. for 16 hours, the materials, as noted above, were found to have a surface area from about 100 to about 200 m$^2$/g and an average pore radius from 75 to 150 A.

The alumina-aluminum phosphate composite precipitates of this invention are well suited for use as catalysts per se; for use in catalytic cracking at high temperatures; or for use as catalyst supports in reactions such as hydrogenation wherein a hydrogenation metal or metals from Group VI and/or Group VIII are deposited on the surface of the alumina-aluminum phosphate. Lloyd A. Pine in U.S. Pat. No. 3,904,550 discusses another technique for making alumina and aluminum phosphate precipitates and indicates that his precipitates are superior to the hydrogels of Kearby (U.S. Pat. Nos. 3,271,299 or 3,342,750) in their sensitivity to surface area loss on contact with water. Pine in Column 1, lines 15-40, indicates that Kearby's hydrogels are disadvantageous in that the surface area of the hydrogels decreases substantially when aqueous solutions having metals are deposited on the hydrogels by standard impregnation techniques. While the precipitates of the present invention are thermally stable, they possess a water sensitivity slightly greater than the water sensitivity of Pine's precipitates but a lower sensitivity than precipitates made by the conventional procedure. Thus while hydrogenation metals can be deposited on the alumina-aluminum phosphate coprecipitates by the standard aqueous impregnation techniques, a certain decrease in surface area results.

In addition, the final catalyst can have admixed therewith portions of other inorganic materials such as silica clays or molecular sieves in amounts ranging from 10 to 75 weight percent of the final catalyst. The addition of molecular sieves such as the Type X and Type Y sieves would increase the hydrocracking activity of the final composite catalyst. The molecular sieves and/or clay and/or silica gel can be admixed with the aluminum phosphate precipitates or coprecipitates of this invention before or after the drying and/or calcining and before or after the addition of any desired metallic components such as those described above.

The physical form of the aluminum phosphate materials of this invention depends to a large extent on the technique of drying. For example, the precipitates can be filtered and oven-dried and coarse granules can be obtained by breaking up and sieving the oven-dried cake to any desired size. In place of oven-drying, spray-drying of the alumina-aluminum phosphate coprecipitates can occur, and the spray-dried materials are of a fluid nature and will all pass through a 300-mesh sieve. The alumina-aluminum phosphate materials can also be extruded in 1/32 inch (0.08 cm) to 3/16 inch (0.47 cm) or larger diameter extrudates.

The invention will be further described with reference to the following experimental work.

EXAMPLE 1

This example will illustrate the preparation of a calcined amorphous alumina-aluminum phosphate coprecipitate.

A strongly acidic solution containing aluminum cations and ortho-phosphate anions was prepared by dissolving 200 grams (0.53 mole) of aluminum nitrate in 2 liters of distilled water and then adding 31 grams (0.265 mole) of an 85% solution of ortho-phosphoric acid. A second solution was prepared by diluting 300 ml of concentrated (28%) ammonium hydroxide with 300 ml of distilled water.

A stirred reaction vessel was charged with 1000 ml of distilled water. To this distilled water was added the previously described acidic solution at a rate of approximately 100 ml per minute. The ammonium hydroxide solution was added simultaneously at a rate sufficient to maintain the pH of the stirred reaction mixture at a constant value of 10.0. After the addition of the acidic solution was completed, the reaction mixture was stirred for an additional 10 minutes. The precipitated aluminum phosphate then was filtered, washed with 8000 ml of distilled water adjusted to a pH of 8.0 with $NH_4OH$ and dried overnight at 120° C. The oven-dried granular material was calcined in air at 500° C. in a muffle furnace for 16 hours. The alumina-aluminum phosphate composite precipitate was found to be amorphous after calcination and to have an aluminum to phosphorus atomic ratio of 2:1, i.e. the $Al_2O_3$ to $AlPO_4$ molar ratio is 0.33 to 0.67. The material was thereafter further calcined at 900° C. for 16 hours.

The physical properties and thermal stability of this material are set forth in Table 1 below.

TABLE 1

| Properties of $Al_2O_3 \cdot 2AlPO_4$ Made as per Ex. 1 | | |
|---|---|---|
| Calcination Temp. ° C. | 500 | 900 |
| Pore Vol. (cc/g) | 0.81 | 0.69 |
| Avg. Pore Radius (A) | 100 | 104.3 |
| Surface Area (m²/g) | 162.4 | 132.2 |
| Loss of Surface Area at 900° C. | | 19% |

The procedure of Example 1 was repeated a number of times, and alumina-aluminum phosphate coprecipitates were obtained which after calcination at 500° C. for 16 hours had average pore radii varying from about 90 A to about 132 A and surface areas varying from 100 to 200 m²/g.

EXAMPLES 2-8

A series of calcined amorphous coprecipitates containing the aluminum and phosphorus moieties in varying atomic ratios were prepared in substantially the same manner described in Example 1 above, except the precipitating agent was varied; the pH was varied; and the quantities of the aluminum nitrate and the ortho-phosphoric acid were varied to give the desired aluminum to phosphorus atomic ratios as shown in Table 2 below. The physical characteristics along with the decrease in surface area after additional calcination of the varying materials at 900° C. for 16 hours is also given in Table 2.

Referring to Table 2, the pore size characteristics surface area and thermal stability as measured by the percent loss in surface area are all within the invention.

TABLE 2

| Ex. No. | 2 | | 3 | | 4 | | 5 | | 6 | | 7 | | 8 | |
|---|---|---|---|---|---|---|---|---|---|---|---|---|---|---|
| Al:PO₄ ratio | 1.5 | | 1.5 | | 4.0 | | 4.0 | | 2.0 | | 4.0 | | 3.0 | |
| Precipitating Agent | $NH_4OH$ | | $NH_4HCO_3{}^a$ | | $NH_4OH$ | | $NH_4HCO_3{}^a$ | | $NH_4HCO_3{}^a$ | | $NH_4OH$ | | $NH_4HCO_3{}^a$ | |
| pH of Precipitation | 10.0 | | 10.0 | | 8.0 | | 10 | | 10 | | 8 | | 10 | |
| Calcination Temp ° C. | 500 | 900 | 500 | 900 | 500 | 900 | 500 | 900 | 500 | 900 | 500 | 900 | 500 | 900 |
| Pore Vol (cc/g) | 0.78 | 0.81 | 0.81 | 0.72 | 0.98 | 0.88 | 0.72 | 0.61 | 0.86 | 0.76 | 1.02 | 0.97 | 0.79 | 0.68 |
| Avg. Pore Radius (A) | 90.3 | 97.7 | 94.2 | 96.3 | 114.2 | 127.8 | 80.8 | 84.6 | 103.4 | 121.9 | 100.4 | 119.7 | 77.0 | 89.5 |
| S.A. (m²/g) | 173.1 | 165.5 | 172.7 | 149.6 | 172.1 | 138.2 | 179.0 | 144.4 | 167.0 | 124.2 | 203.1 | 162.6 | 204.0 | 151.0 |

TABLE 2-continued

| % Loss of S.A. at 900° C | 4 | 7 | 20 | 19 | 26 | 20 | 26 |

$^a$pH of aqueous NH$_4$HCO$_3$ adjusted to 10.8 to 11.0 by addition of NH$_4$OH.

EXAMPLE 9

The run for this Example illustrates the preparation of an alumina-aluminum phosphate precipitate having the same chemical formula as in Example 1 (0.33 Al$_2$O$_3$.0.67 AlPO$_4$) except this preparation is made by the "conventional method" as described in Example 2 of U.S. Pat. No. 3,342,750 to Kearby.

750 grams (2 moles) of Al(NO$_3$)$_3$.9H$_2$O were dissolved in 5 liters of water (distilled), and to this was added 115 grams (1 mole) of 85% H$_3$PO$_4$ with stirring to form a first solution.

A second solution containing 500 cc of 28% NH$_4$OH in 500 cc of distilled water was prepared.

The second solution was added slowly with vigorous mixing to the first solution until the pH gradually increased to 8.0. A total of 840 cc of the second solution was required. As the pH increased from about 6 to 8.0, a precipitate formed which was then filtered and washed with 2 liters of distilled water.

Thereafter the precipitate was dried at 120° C. and calcined in air at 500° C. for 16 hours. A portion of this material was further calcined at 900° C. for 16 hours.

The physical properties of the calcined materials was determined and are set forth in Table 3 below. All calcined samples were amorphous by X-ray diffraction.

TABLE 3

| Properties of Material from Ex. 9 | | |
|---|---|---|
| Calcination Temp. ° C. | 500 | 900 |
| Pore Vol. (cc/g) | 0.74 | 0.69 |
| Avg. Pore Radius (A) | 67.9 | 91.5 |
| Surface Area (m$^2$/g) | 219.0 | 150.2 |
| % Loss of Surface Area at 900° C. | | 31 |

Referring to Table 3, it can be seen that the percent loss of surface area on added calcination was 31%.

EXAMPLE 10

The run for this example illustrates the preparation of alumina-aluminum phosphate by the technique described by Pine in U.S. Pat. No. 3,904,550.

695 grams of aluminum sec-butoxide were added to a stirred 3-liter, 3-necked flask equipped with a reflux condenser and heated to 82° C. (180° F.).

To the flask was added slowly over a 3-hour period a mixture of 1000 ml. of isopropyl alcohol, 134 grams of water and 56 grams phosphoric acid (85%) while maintaining the temperature at 82° C.

After the addition was completed, stirring was continued while the product was allowed to cool for 50 minutes. The stirrer and the reflux cooling liquid then were shut off, and the reaction product was allowed to cool overnight.

The product was removed from the flask and filtered. The filtercake was dried at 54° C. to drive off the isopropyl alcohol and calcined in air at 1000° F. (538° C.) for two hours. The pore properties and surface area were determined as shown in Table 4 below.

A portion of this calcined material was given an additional calcination at 900° C. for 16 hours. The pore properties and surface area are shown below on Table 4.

TABLE 4

| Properties of Material from Ex. 10 | | |
|---|---|---|
| Calcination Temp. (° C.) | 538 | 900 |
| Pore Vol. (cc/g) | 0.96 | 0.65 |
| Avg. Pore Radius (A) | 67.3 | 94.5 |
| Surface Area (m$^2$/g) | 284.8 | 137.8 |
| % Loss of Surface Area at 900° C. | | 52 |

The above Example 10 is a duplicate of Example 1 of U.S. Pat. No. 3,904,550 to Pine and is shown as Al$_2$O$_3$.—AlPO$_4$, preparation C in Table I of Pine. From the pore volume and surface area data given by Pine in his Table I, the average pore radius can be calculated using the formula discussed above and is 88 A for preparation C.

Kearby in U.S. Pat. No. 3,271,299 shows in Table IV that for his alcohol extracted materials the surface area goes from 527 to 493 after calcining at 1400° F. (764° C.). The percent loss in surface area is about 6%, and the average pore radius of Kearby's material calcined at 1200° F. (650° C.) is about 24 A (half the 48 A pore diameter shown in Table IV of Kearby).

Figure 10:
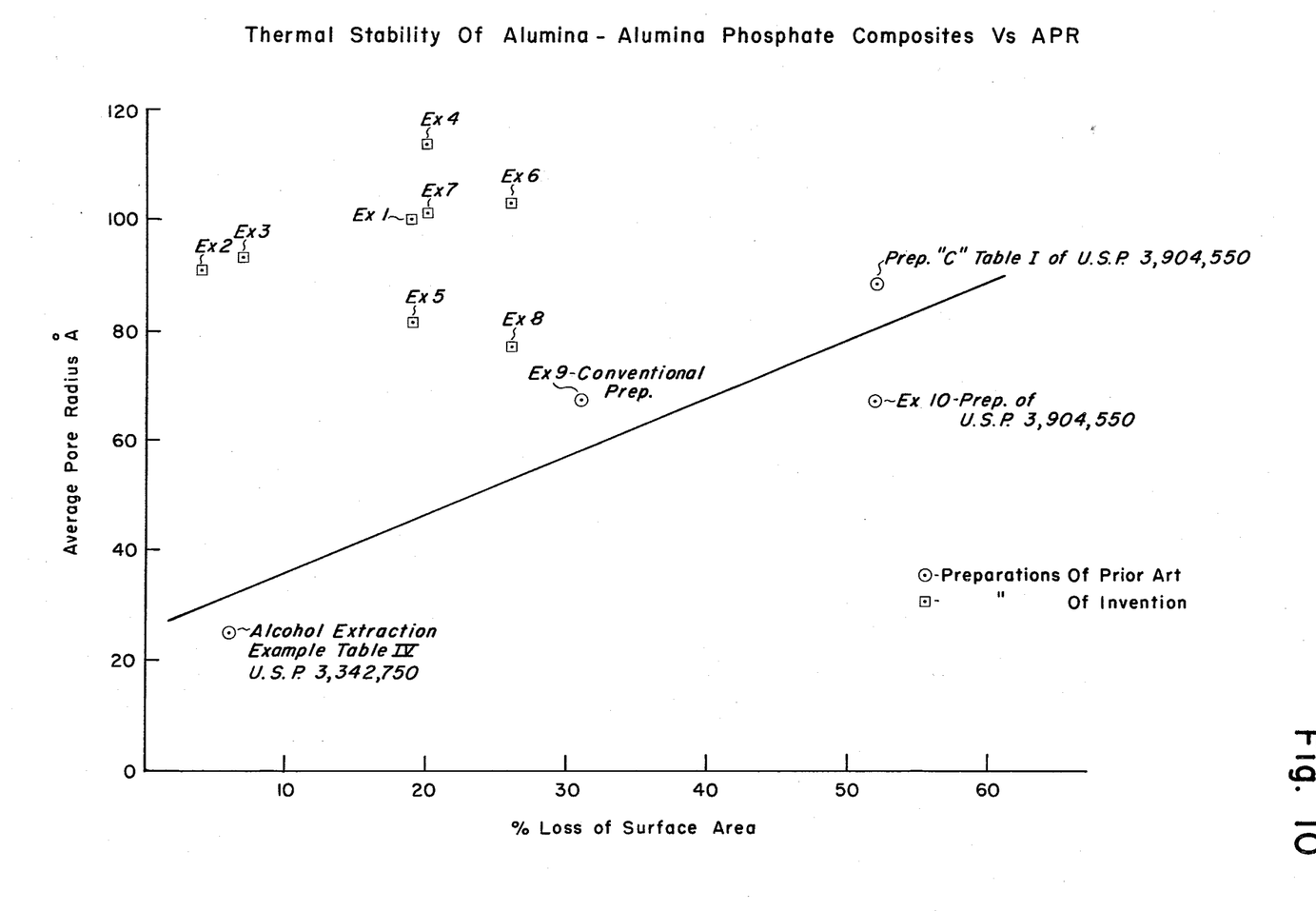

The "% Loss in Surface Area" versus the average pore radius for the materials shown in Examples 1-10 and the "alcohol extracted" material from Table IV of Kearby are plotted on the attached FIG. 10. It should be noted that Kearby's alcohol extracted material was calcined at differing conditions than Examples 1-9 above to determine the percent loss of surface area. Kearby calcined first for only three hours at 1200° F. (649° C.) and then for 48 hours at 1400° F. (760° C.) while the coprecipitates of Examples 1-9 above were calcined first at 500° C. for 16 hours and then 900° C. for 16 hours. Referring to FIG. 10, it can readily be seen that the Kearby, Pine and so-called conventional preparation Al$_2$O$_3$—2AlPO$_4$ provide an expected thermal stability as measured by the percent loss in surface area versus average pore radius, and, as the average pore radius increases, the stability decreases. Unexpectedly, the relatively high average pore radius of the alumina-aluminum phosphate materials of this invention have much greater stability (less percent loss of surface area with increased calcination) than the prior art would predict, especially for the materials of this invention having average pore radii over 90 A. Thus the materials of this invention are particularly suited for use as supports for catalysts.

EXAMPLE 11

The procedure of Example 1 was repeated except the pH during precipitation was maintained at 8.0 and the proportions of aluminum nitrate and orthophosphoric acid were stoichiometrically equal so as to produce an AlPO$_4$ precipitate with no excess alumina. The precipitate was filtered, oven-dried and calcined at 500° C. for 16 hours. The resulting material was found to have a surface area of 69.5 m$^2$/g and an average pore radius of 33.

EXAMPLE 12

Example 1 was repeated except the pH during precipitation was maintained at 6.0. The alumina-aluminum phosphate coprecipitate after calcination at 500° C. for 16 hours had a pore volume of 0.34 cc/gram; an average pore radius of 87.8 A and a surface area of 78.8 m²/g.

EXAMPLE 13

Example 12 was repeated except the amounts of aluminum nitrate and phosphoric acid were adjusted to result in a product having the stoichiometric formula 0.14 $Al_2O_3$—0.86 $AlPO_4$. The alumina-aluminum phosphate coprecipitate after calcination at 500° C. for 16 hours had a pore volume of 0.18 cc/gram; an average pore radius of 64 A and a surface area of 55 m²/g.

Examples 12 and 13 show that maintaining a pH of 6 during precipitation results in alumina-aluminum phosphate coprecipitates having characteristics outside the limits defined by the invention.

Resort may be had to such variations and modifications as fall within the spirit of the invention and the scope of the appended claims.

I claim:

1. A thermally stable composite precipitate containing from 10 to 60 mole percent alumina and from 40 to 90 mole percent aluminum phosphate, said composite precipitate being characterized after calcination at 500° C. for 16 hours as:
   amorphous;
   having a surface area from about 100 to about 200 m²/g;
   having an average pore radius of from 75 to 150 A; and wherein no more than a 30% decrease in surface area is obtained if said composite precipitate is further calcined at a temperature up to about 900° C. for up to 16 hours.

2. A composite in accordance with claim 1 wherein the molar ratio of $Al_2O_3$ to $AlPO_4$ is about 1:2.

3. A composite precipitate according to claim 1 which is a granular precipitate.

4. A composite precipitate according to claim 1 which is spray-dried prior to calcination to produce a fluid form of composite precipitate.

5. A composite precipitate in accordance with claim 1 wherein the average pore radius is from 90 A to 150 A.

6. A composite precipitate in accordance with claim 1 wherein the average pore radius is from 100 A to 130 A.

7. A composite according to claim 6 wherein the molar ratio of $Al_2O_3$ to $AlPO_4$ is about 1:2.

8. A method of preparing a thermally stable composite precipitate containing from 10 to 60 mole percent alumina and from 40 to 90 mole percent aluminum phosphate, which comprises:
   forming a first aqueous solution of aluminum cations and $PO_4^{---}$ anions wherein the molar ratio of the $PO_4^{---}$ anions to the aluminum cations is 0.82:1 to 0.25:1;
   neutralizing said first aqueous solution with ammonia gas or a second aqueous solution of an ammonia based material selected from the group consisting of ammonium hydroxide, ammonium carbonate, ammonium bicarbonate or urea in such a manner that the pH of the combined first aqueous solution and the neutralizing medium is controlled in the range of 7 to 10.0;
   recovering said precipitate;
   drying said precipitate; and
   calcining said precipitate at a temperature from 300° C. to 500° C. for a time up to 16 hours to form an amorphous aluminum phosphate composite material having a surface area from about 100 to about 200 m²/g, an average pore radius from 75 to 150 A and wherein no more than a 30% decrease in surface area is obtained if said composite precipitate is calcined at 500° C. for 16 hours and further calcined at a temperature up to about 900° C. for up to 16 hours.

9. A method according to claim 8 wherein $H_3PO_4$ is used to supply the $PO_4^{---}$ anions.

10. A method according to claim 9 wherein the basic medium used to neutralize said first aqueous solution is ammonia gas.

11. A method in accordance with claim 9 wherein the amount of aluminum and the amount of phosphoric acid are correlated to result in a final product having a molar ratio of $Al_2O_3$ to $AlPO_4$ of about 1:2.

12. A method in accordance with claim 10 wherein the aluminum cations are supplied by using an aluminum salt selected from the group consisting of aluminum nitrate and aluminum chloride.

13. A method in accordance with claim 8 wherein the precipitate is dried by spray-drying to form a fluid type of aluminum phosphate material.

* * * * *

UNITED STATES PATENT OFFICE
CERTIFICATE OF CORRECTION

Patent No. 4,080,311      Dated March 21, 1978

Inventor(s) William L. Kehl

It is certified that error appears in the above-identified patent and that said Letters Patent are hereby corrected as shown below:

Abstract, line 6, "$PO_4$ anions" should read --$PO_4^{---}$ anions--;

Abstract, line 8, after "ammonia" add --gas--;

Col. 1, line 51 - "composition" should be --composite--;

Col. 9, line 29 - "was" should be --were--.

Signed and Sealed this

Twenty-ninth Day of August 1978

[SEAL]

Attest:

RUTH C. MASON
Attesting Officer

DONALD W. BANNER
Commissioner of Patents and Trademarks